(12) United States Patent
Tanaka et al.

(10) Patent No.: US 9,318,764 B2
(45) Date of Patent: Apr. 19, 2016

(54) PROTON CONDUCTING POLYMER MEMBRANE, MEMBRANE-ELECTRODE ASSEMBLY USING SAME, AND POLYMER ELECTROLYTE FUEL CELL

(75) Inventors: Toru Tanaka, Fujimi (JP); Katsutoshi Suzuki, Hino (JP); Haruhiko Komoriya, Iruma-gun (JP); Arata Takahashi, Tokyo (JP); Saori Itabashi, Kawagoe (JP)

(73) Assignee: Central Glass Company, Limited, Ube-shi (JP)

( * ) Notice: Subject to any disclaimer, the term of this patent is extended or adjusted under 35 U.S.C. 154(b) by 259 days.

(21) Appl. No.: 14/007,241

(22) PCT Filed: Apr. 13, 2012

(86) PCT No.: PCT/JP2012/060150
§ 371 (c)(1),
(2), (4) Date: Sep. 24, 2013

(87) PCT Pub. No.: WO2012/141296
PCT Pub. Date: Oct. 18, 2012

(65) Prior Publication Data
US 2014/0023953 A1    Jan. 23, 2014

(30) Foreign Application Priority Data

Apr. 15, 2011 (JP) .................. 2011-091442
Apr. 11, 2012 (JP) .................. 2012-090015

(51) Int. Cl.
*H01M 8/10* (2006.01)
*H01B 1/12* (2006.01)
*C08J 5/22* (2006.01)

(52) U.S. Cl.
CPC ............ *H01M 8/1039* (2013.01); *C08J 5/2225* (2013.01); *H01B 1/122* (2013.01);
(Continued)

(58) Field of Classification Search
CPC ........ C08J 5/22; H01B 1/122; H01M 8/1011; H01M 8/1023; H01M 8/1037; H01M 8/1039; H01M 8/1053; Y02E 60/523; Y10T 156/10
See application file for complete search history.

(56) References Cited

U.S. PATENT DOCUMENTS

2006/0286424 A1    12/2006  Sugiyama
2009/0297903 A1*   12/2009  Hirayama et al. .............. 429/26
(Continued)

FOREIGN PATENT DOCUMENTS

JP      63-76265 A      4/1988
JP      2002-260727 A   9/2002
(Continued)

OTHER PUBLICATIONS

International Search Report with English translation dated Jun. 5, 2012 (five (5) pages).
(Continued)

*Primary Examiner* — Patrick Ryan
*Assistant Examiner* — Ben Lewis
(74) *Attorney, Agent, or Firm* — Crowell & Moring LLP (57) ABSTRACT

Disclosed is a proton conducting polymer membrane formed by laminating a plurality of solid electrolyte membranes. This proton conducting polymer membrane is one prepared by laminating at least one layer of a solid electrolyte membrane formed by using a resin having a bis(perfluoroalkanesulfonyl)methide group in the chemical structure. This solid electrolyte membrane has a superior proton conductivity without transmitting the fuel (methanol or hydrogen).

11 Claims, 4 Drawing Sheets

(52) U.S. Cl.
CPC ......... *H01M 8/1023* (2013.01); *H01M 8/1053* (2013.01); *H01M 8/1011* (2013.01); *H01M 8/1037* (2013.01); *Y02E 60/523* (2013.01); *Y10T 156/10* (2015.01)

(56) References Cited

U.S. PATENT DOCUMENTS

| | | | |
|---|---|---|---|
| 2010/0009236 A1* | 1/2010 | Kotera et al. | 429/33 |
| 2010/0055539 A1* | 3/2010 | Yokota et al. | 429/34 |
| 2012/0142791 A1* | 6/2012 | Obara et al. | 521/27 |

FOREIGN PATENT DOCUMENTS

| | | | | |
|---|---|---|---|---|
| JP | 2003-86202 A | 3/2003 | | |
| JP | 2003-303600 A | 10/2003 | | |
| JP | 2004-55311 A | 2/2004 | | |
| JP | 2005-162623 A | 6/2005 | | |
| JP | 2011-63797 | * 3/2011 | ............ | C08G 77/28 |
| JP | 2011-63797 A | 3/2011 | | |
| WO | WO 2010/024338 A1 | 3/2010 | | |
| WO | WO 2011/021648 A1 | 2/2011 | | |
| WO | WO 2011/102327 A1 | 8/2011 | | |

OTHER PUBLICATIONS

Japanese-language Written Opinion (PCT/ISA/237) dated Jun. 5, 2012 (four (4) pages).
Korean Office Action dated Mar. 20, 2015 (four (4) pages).
Linda Ghassemzadeh Khoshkroodi, "Polymer Electrolyte Membrane Degradation and Mobility in Fuel Cells: a Solid-state NMR Investigation", Thesis, 2010 (149 pages).

* cited by examiner

PROTON CONDUCTING POLYMER MEMBRANE, MEMBRANE-ELECTRODE ASSEMBLY USING SAME, AND POLYMER ELECTROLYTE FUEL CELL

TECHNICAL FIELD

The present invention relates to a proton conducting polymer membrane, which is preferably usable for polymer electrolyte fuel cells, and a membrane-electrode assembly using the same. It relates to a proton conducting polymer membrane, which is preferably usable particularly for direct methanol fuel cells in polymer electrolyte fuel cells, and a membrane-electrode assembly using the same.

BACKGROUND OF THE INVENTION

Polymer electrolyte fuel cells are characterized by using a proton conducting polymer membrane as the electrolyte. It is mainly composed of a fuel electrode, an air electrode, and a proton conducting polymer membrane sandwiched between both electrodes. It is an electrochemical device to generate electricity by reacting a fuel and oxygen to generate an electromotive force between the fuel electrode and the oxygen electrode. The proton conducting polymer membrane is sandwiched between the fuel electrode and the air electrode and plays a role as an electrolyte to transport protons into the membrane.

In polymer electrolyte fuel cells, in case that the fuel is hydrogen, hydrogen supplied to the fuel electrode is converted to hydrogen ions $H^+$ (protons) and electrons to give the electrons to the fuel electrode, and the protons pass through the proton conducting polymer membrane to move to the air electrode. The protons that have moved to the air electrode react with oxygen at the air electrode and obtain electrons from the air electrode, thereby producing water. Upon this, the reaction at the fuel electrode is represented by "$H_2 \rightarrow 2H^+ + 2e^-$", the reaction at the air electrode is represented by "$O_2 + 4H^+ + 4e^- \rightarrow 2H_2O$", and the reaction in total is represented by "$2H_2 + O_2 \rightarrow 2H_2O$".

On the other hand, in direct methanol fuel cells, the fuel is methanol, and methanol is reacted with water on the fuel electrode by using a catalyst to convert methanol to carbon dioxide, protons and electrons. Upon this, the reaction at the fuel electrode is represented by "$CH_3OH + H_2O \rightarrow CO_2 + 6H^+ + 6e^-$", the reaction at the air electrode is represented by "$O_2 + 4H^+ + 4e^- \rightarrow 2H_2O$", and the reaction in total is represented by "$2CH_3OH + 3O_2 \rightarrow 2CO_2 + 4H_2O$". In direct methanol fuel cells, a methanol oxidation electrode catalyst-supported electrode is used as the fuel electrode, and a reduction catalyst-supported electrode is used as the air electrode.

Furthermore, in the present invention, the proton conducting polymer membrane refers to a polymer membrane that transmits protons. Furthermore, the solid electrolyte membrane is a membrane that does not transmit electrons, but transmits only ions and refers to a membrane made of a polymer (resin) having an insulation quality that does not make a short circuit between the negative electrode and the positive electrode.

As the performance requirements of the proton conducting polymer membrane, it is possible to mention that it easily transmits protons, namely, high proton conductivity, that it has a sufficient performance to block transmission (cross leak) of methanol and hydrogen as the fuels and oxygen, that it is superior in strength and heat resistance, and that it is superior in water resistance and chemical stability, etc.

However, proton conducting polymers used up to now as the materials of proton conducting polymer membranes for polymer electrolyte fuel cells have not satisfied all of these performance requirements. Therefore, theoretical potential differences have not been obtained. It has been a major obstacle to the development and the spread of polymer electrolyte fuel cells.

In particular, in direct methanol fuel cells, there becomes problematic a methanol cross over phenomenon in which methanol supplied to the fuel electrode passes through the proton conducting polymer membrane, reaches the air electrode, and reacts with $O_2$ to produce $CO_2$ and $H_2O$. The methanol cross over phenomenon can be prevented by making the proton conducting polymer membrane thicker. If the proton conducting polymer membrane is made thicker, however, there has been a problem that it becomes difficult to allow protons to pass through the proton conducting polymer membrane, that is, the membrane resistance against protons becomes greater, thereby lowering the output of the direct methanol fuel cells.

In the case of polymer electrolyte fuel cells using hydrogen as the fuel, in general, perfluorosulfonic acid series resins are used for proton conducting polymer membranes, in which water is adsorbed to the surroundings of the sulfonic acid group to form a cluster structure, in which water gathers like a cluster of grapes relative to the sulfonic acid group. The proton conductivity appears by the movement of protons by using a cluster, which is an aggregate of this water, as a channel (medium). Therefore, it is necessary to maintain a sufficient amount of water in a perfluorosulfonic acid series resin in order to make the perfluorosulfonic acid series resin demonstrate a high proton conductivity.

In direct methanol fuel cells, however, there has been a problem that methanol, which is high in hydrophilicity, is dissolved in water making the cluster and more easily passes through the membrane by maintaining more water in the perfluorosulfonic acid series resin, resulting in the occurrence of methanol cross over phenomenon.

Thus, in direct methanol fuel cells, in the case of using a perfluorosulfonic acid series resin for the proton conducting polymer membrane, there has been a problem that methanol, which is high in hydrophilicity, is dissolved in water of the cluster of the perfluorosulfonic acid series resin and passes through the proton membrane, thereby lowering the output of direct methanol fuel cells.

A technique for suppressing such methanol cross leak, namely, methanol cross over phenomenon is disclosed in Patent Publication 1 or Patent Publication 2.

Patent Publication 1 discloses an ordinary temperature type, acid, direct methanol fuel cell characterized by that, as solid electrolyte membranes between the positive electrode and the negative electrode, polystyrene graft polymerization membranes having a sulfonic acid group in the chemical structure are used on both sides of a cation-exchange membrane and that at least two of the cation-exchange membranes are disposed by lamination.

Furthermore, Patent Publication 2 discloses a fullerene derivative-containing proton conducting membrane that is superior in performance to block transmission of methanol and in proton conductivity, an electrolyte membrane, a membrane-electrode assembly, and an electrochemical device.

In the direct methanol fuel cell described in Patent Publication 1, the membrane thickness is made thick by laminating cation-exchange membranes, thereby blocking the transmission of methanol. By laminating cation-exchange membranes, the transmission of methanol in the cation-exchange membranes is lowered. However, the lamination of cation-exchange membranes increases the membrane's resistance against protons. Therefore, there has been a concern that the output of the direct methanol fuel cell is lowered, thereby lowering the power generation capacity. In addition, there has been a concern that the production process becomes complicated by laminating a plurality of cation-exchange membranes, thereby making the membrane-electrode assembly have a high price.

Thus, in polymer electrolyte fuel cells, there has been a problem that, when the membrane thickness of the proton conducting polymer membrane is made thick in order to prevent the cross leak in which methanol or hydrogen supplied to the fuel electrode passes through the proton conducting polymer membrane and moves to the air electrode side, it becomes difficult to transmit protons, that is, the membrane resistance against protons becomes large, thereby lowering the output of polymer electrolyte fuel cells.

The fullerene derivative-containing complex membrane described in Patent Publication 2 is not perfect in terms of prevention of leak of the proton conducting group. Furthermore, there has been a problem that an industrial mass production is difficult due to the use of fullerene as a raw material, and a membrane-electrode assembly to be produced has a high price.

A solid electrolyte membrane as a resin membrane containing a sulfonic acid group as a strong acid group, which is used in polymer electrolyte fuel cells using hydrogen as a fuel, has a high conductance of methanol. This is because diffusion of methanol is accelerated due to a strong maintenance of water in the membrane by a strong hydrophilicity of the sulfonic acid group. Furthermore, a perfluoro resin series electrolyte membrane is formed with micropores capable of transmitting methanol by the cluster structure. Therefore, it has been difficult to say that it is preferable to use that for direct methanol fuel cells.

The solid electrolyte membrane with a suppressed methanol conductance, which is described in Patent Publication 1 or Patent Publication 2, has a hard membrane quality. Thus, it has been difficult to say that it is adhered to the electrodes with good adhesion.

A proton conducting polymer membrane is required to easily transmit protons, namely, a high proton conductance, to be sufficient in capacity for blocking the transmission (cross leak) of methanol and hydrogen as the fuels and oxygen, and to be superior in strength, heat resistance, water resistance and chemical stability. When having made a membrane-electrode assembly, it is required that adhesion between the proton conducting polymer membrane and the electrode plate (in the following, simply referred to as electrode) is satisfactory.

PRIOR ART PUBLICATIONS

Patent Publications

Patent Publication 1: Japanese Patent Application Publication Showa 63 (1988)-76265
Patent Publication 2: Japanese Patent Application Publication 2004-55311

SUMMARY OF THE INVENTION

It is an object of the present invention to provide a proton conducting polymer membrane, which is free from cross leak of the fuel, namely, transmission of the fuel (methanol and hydrogen), and has a superior proton conductance, a membrane-electrode assembly and a polymer electrolyte fuel cell using the same. In particular, it is an object to provide a proton conducting polymer membrane, which has a superior proton conductance with no transmission of methanol and has a good adhesion with the electrode, the membrane-electrode assembly, and a direct methanol fuel cell using the same.

Furthermore, it is an object of the present invention to provide a proton conducting polymer membrane, which is superior in strength of the membrane and has a satisfactory adhesion of a surface of bonding with the electrode, a membrane-electrode assembly and a polymer electrolyte fuel cell, particularly a direct methanol fuel cell, using the same.

The present inventors have obtained a proton conducting polymer membrane that is formed by laminating solid electrolyte membranes, the proton conducting polymer membrane being a solid electrolyte membrane having at least one layer formed by using a resin having a bis(perfluoroalkanesulfonyl)methide group in the chemical structure, the proton conducting polymer membrane having a superior proton conductance, being superior in suppressing the methanol transmission, and being adhered to the electrodes with good adhesion, preferably by laminating a solid electrolyte membrane formed by using a resin having a bis(perfluoroalkanesulfonyl)methide group in the chemical structure, and a solid electrolyte membrane formed by using a resin having a sulfonic acid group in the chemical structure. Furthermore, the present inventors have reached an obtainment of a membrane-electrode assembly and a polymer electrolyte fuel cell using the proton conducting polymer membrane.

That is, the present invention contains the following [Invention 1] to [Invention 10].

[Invention 1]
A proton conducting polymer membrane formed by laminating solid electrolyte membranes, wherein at least one layer thereof is a solid electrolyte membrane formed by using a resin having a bis(perfluoroalkanesulfonyl)methide group in the chemical structure.

[Invention 2]
The proton conducting polymer membrane according to Invention 1, wherein the resin having the bis(perfluoroalkanesulfonyl)methide group in the chemical structure is acrylic resin, methacrylic resin, styrene resin, or silicone resin.

[Invention 3]
The proton conducting polymer membrane according to Invention 1 or Invention 2, which is formed by laminating the solid electrolyte membrane formed by using the resin having the bis(perfluoroalkanesulfonyl)methide group in the chemical structure, and a solid electrolyte membrane formed by using a resin having a sulfonic acid group in the chemical structure.

[Invention 4]
The proton conducting polymer membrane according to Invention 3, wherein the resin having the sulfonic acid group in the chemical structure is at least one selected from the group consisting of polystyrene, polyvinyl, polyacrylamide, polyether ether ketone, and polyether.

[Invention 5]
The proton conducting polymer membrane according to Invention 4, wherein the polyvinyl is a resin prepared by a copolymerization between tetrafluoroethylene and a perfluoroalkyl vinyl ether containing the sulfonic acid group in the chemical structure.

[Invention 6]
The proton conducting polymer membrane according to any one of Inventions 3-5, wherein the solid electrolyte membrane formed by using the resin having the sulfonic acid group in the chemical structure is disposed on both sides of the solid electrolyte membrane formed by using the resin having the bis(perfluoroalkanesulfonyl)methide group in the chemical structure.

[Invention 7]

The proton conducting polymer membrane according to Invention 6, consisting of three layers in which the solid electrolyte membrane formed by using the resin having the sulfonic acid group in the chemical structure is disposed on both sides of the solid electrolyte membrane formed by using the resin having the bis(perfluoroalkanesulfonyl)methide group in the chemical structure.

[Invention 8]

A membrane-electrode assembly, characterized by being equipped with the proton conducting polymer membrane according to any one of Inventions 1-7, and a pair of electrodes disposed to interpose the polymer membrane therebetween.

[Invention 9]

A polymer electrolyte fuel cell, characterized by being equipped with the membrane-electrode assembly of Invention 8 and a pair of separators disposed to interpose the assembly therebetween.

[Invention 10]

A direct methanol fuel cell, characterized by being equipped with the proton conducting polymer membrane according to any one of Inventions 1-7.

Advantageous Effect of the Invention

By the present invention, a proton conducting polymer membrane free from the cross leak of the fuel, namely, transmission of the fuel (methanol) was obtained. Using the proton conducting polymer membrane, a membrane-electrode assembly was prepared. When a polymer electrolyte fuel cell, in which proton was used as the fuel, and a direct methanol fuel cell, in which methanol was used as the fuel, which were prepared by using the same, were checked in terms of electric power generation, electromotive forces were obtained. The proton conducting polymer membrane of the present invention can preferably be applied to these fuel cells.

Furthermore, in a proton conducting polymer membrane of the present invention prepared by laminating solid electrolyte membranes containing a sulfonic acid group on both sides of a solid electrolyte membrane containing a bis(perfluoroalkanesulfonyl)methide group, a layer of the solid electrolyte membrane containing a bis(perfluoroalkanesulfonyl)methide group blocks methanol, and the solid electrolyte membranes containing a sulfonic acid group become good adhesion layers with the electrodes. Thus, there was provided a proton conducting polymer membrane having a superior methanol blocking property in addition to proton conductivity and a good adhesion with the electrodes. In this manner, there were obtained a proton conducting polymer membrane having a superior membrane strength and a good adhesion of surfaces of bonding with the electrodes, a membrane-electrode assembly and a direct methanol fuel cell, which were prepared by using the same, by a proton conducting polymer membrane prepared by laminating solid electrolyte membranes having different chemical structures.

DETAILED DESCRIPTION

A proton conducting polymer membrane in the present invention is a laminated membrane prepared by laminating solid electrolyte membranes using a resin.

In the present invention, at least one solid electrolyte membrane made of a resin containing at least bis(perfluoroalkanesulfonyl)methide group was used as the material of the proton conducting polymer membrane as a laminated membrane. With this, there was obtained an effect for making the proton conducting polymer membrane suppress the transmission of methanol or hydrogen. In particular, by using a lamination of a solid electrolyte membrane made of a resin having a bis (perfluoroalkanesulfonyl)methide group in the chemical structure with a solid electrolyte membrane made of a resin having a sulfonic acid group in the chemical structure to obtain an effect for achieving an adhesion to the electrodes with a good adhesion, there was obtained a proton conducting polymer membrane having proton conductivity, the suppression of transmitting methanol or hydrogen, and a good adhesion to the electrodes. The group is a name of a partial structure of compounds. Bis(perfluoroalkanesulfonyl)methide group is a group having in the chemical structure a structure represented by the following general formula (1).

(1)

In the general formula (1), Rf represents a perfluoroalkyl group. In the proton conducting polymer membrane of the present invention, it is preferable that Rf is a $C_{1-4}$ perfluoroalkyl group, since the synthesis is easy and a resin containing a bis(perfluoroalkanesulfonyl)methide group becomes soft.

In the present invention, there was used a proton conducting polymer membrane prepared by laminating the above-mentioned solid electrolyte membranes containing different groups. With this, when having made a direct methanol fuel cell, there was obtained a proton conducting polymer membrane that was free from cross leak of the fuel and superior in strength of the membrane to cause the membrane to hardly break and that adhered to the electrodes with good adhesion. In particular, a proton conducting polymer membrane having a three-layer structure (preferably a proton conducting polymer membrane formed of the three-layer structure) prepared by a lamination by sandwiching a solid electrolyte membrane containing a bis(perfluoroalkanesulfonyl)methide group, which suppresses the transmission of methanol and hydrogen, between solid electrolyte membranes containing a sulfonic acid group, which adhere to the electrode with good adhesion, particularly shows a high methanol blocking property by the methanol and hydrogen blocking capability of the bis(perfluoroalkanesulfonyl)methide group containing layer of the inside and adhesion of the sulfonic acid group containing layer to the electrodes, in addition to proton conductance. Therefore, among polymer electrolyte fuel cells, a proton conducting polymer membrane of the present invention is effective in direct methanol fuel cells.

A membrane-electrode assembly is obtained by adhesion and disposition in a manner that both sides of a proton conducting polymer membrane of the present invention are interposed between a pair of electrodes. In the case of a membrane-electrode assembly used for direct methanol fuel cells, it is possible to use as the fuel electrode an electrode having a methanol oxidation electrode catalyst carried thereon and as the air electrode an electrode having an oxygen reduction catalyst carried thereon. When making a polymer electrolyte fuel cell, plate components that interpose the membrane-electrode assembly therebetween to perform a function of blocking the fuel gas and the air are separators.

A proton conducting polymer membrane, a membrane-electrode assembly, and a polymer electrolyte fuel cell of the present invention are each explained.

1. Proton Conducting Polymer Membrane

A proton conducting polymer membrane of the present invention is characterized by using at least one solid electrolyte membrane formed by using a resin having a bis(perfluoroalkanesulfonyl)methide group in the chemical structure, which has an alcohol blocking property.

In a proton conducting polymer membrane of the present invention, it is preferable to laminate a solid electrolyte membrane having a different chemical structure, on both surfaces or one surface of a solid electrolyte membrane formed by using a resin having a bis(perfluoroalkanesulfonyl)methide group in the chemical structure.

In the case of using a lamination of a solid electrolyte having a different chemical structure in the proton conducting polymer membrane, each solid electrolyte membrane is required to have proton conductance. This is because, if a layer having no proton conductance exists in a laminated proton conducting polymer membrane formed by laminating solid electrolyte membranes, the movement of protons is blocked by the layer to impair proton conductance of the proton conducting polymer membrane as a whole.

Furthermore, in a proton conducting polymer membrane of the present invention, it is preferable to laminate a solid electrolyte membrane formed by using a resin having a bis (perfluoroalkanesulfonyl)methide group in the chemical structure with a solid electrolyte membrane formed by using a resin having a sulfonic acid group in the chemical structure, which has proton conductance.

By laminating a solid electrolyte membrane formed by using a resin having a bis(perfluoroalkanesulfonyl)methide group in the chemical structure with a solid electrolyte membrane formed by using a resin having a sulfonic acid group in the chemical structure, there was obtained a proton conducting polymer membrane having a superior methanol transmission suppression effect of the layer formed by using the resin having the bis(perfluoroalkanesulfonyl)methide group in the chemical structure and a superior adhesion to the electrodes, which is possessed by the resin having the sulfonic acid group in the chemical structure, in addition to proton conductance.

A proton conducting polymer membrane of the present invention is preferably a membrane having a three-layer structure prepared by a lamination by sandwiching a solid electrolyte membrane formed by using a resin having a bis (perfluoroalkanesulfonyl)methide group in the chemical structure between solid electrolyte membranes formed by a resin having a sulfonic acid group in the chemical structure and is more preferably a membrane formed by the three-layer structure.

Figure 2:
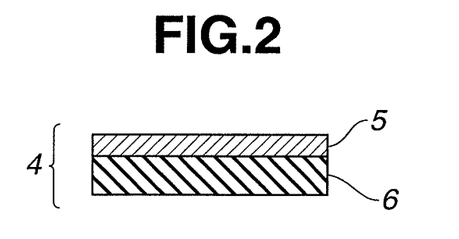
FIG. 2 is a schematic sectional view of an electrode prepared by the present example.

Next, a preferable embodiment of the proton conducting polymer membrane of the present invention is explained by using FIG. 2.

Figure 1:
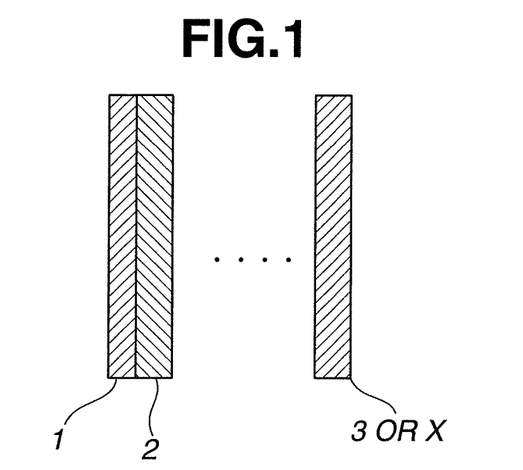
FIG. 1 is a schematic sectional view of one example of the proton conducting polymer membrane of the present invention.

FIG. 1 is a schematic sectional view of one example of the proton conducting polymer membrane of the present invention.

As shown in FIG. 1, the proton conducting polymer membrane of the present invention has a structure prepared by laminating solid electrolyte membranes, and any of layer 1, layer 2, . . . and layer X is a layer formed of a solid electrolyte membrane formed by using a resin having at least a bis (perfluoroalkanesulfonyl)methide group in the chemical structure.

When having made a direct methanol fuel cell, it is possible to form a proton conducting polymer membrane with strength and an enhanced capability by making each layer of layer 1 to layer X from a proton conducting material, by making at least one of them into a layer formed of a solid electrolyte membrane formed by using a resin having a bis(perfluoroalkanesulfonyl)methide group in the chemical structure, and by laminating them as shown in FIG. 1 to compensate mutual weaknesses while making the best use of the characteristics of each layer.

For example, a solid electrolyte membrane formed by using a resin having a bis(perfluoroalkanesulfonyl)methide group in the chemical structure is sandwiched between solid electrolyte membranes formed by using a resin having a sulfonic acid group in the chemical structure. The resulting laminated membrane is made to have a three-layer structure. Then, layer 1 and layer 3 are made by using a layer formed by using a resin having a sulfonic acid group in the chemical structure, and layer 2 is made by using a layer formed by using a resin having a bis(perfluoroalkanesulfonyl)methide group in the chemical structure. As a result, when having made a membrane-electrode assembly, platy electrodes and layers 1, 3 made of a resin having a sulfonic acid group in the chemical structure and having softness are adhered to each other to have a good adhesion of the bonded surface. Upon this, a proton conducting polymer membrane of the present invention is made to have a structure prepared by sandwiching a hard resin layer having a bis(perfluoroalkanesulfonyl)methide group in the chemical structure between soft resin layers having a sulfonic acid group in the chemical structure, thereby improving the proton conducting polymer membrane in tensile strength. Furthermore, it is possible to protect the hard resin layer having a bis(perfluoroalkanesulfonyl)methide group in the chemical structure and suppress its damage.

As a method for laminating solid electrolyte membranes when making a proton conducting polymer membrane shown in FIG. 1, it is possible to cite a method in which a plurality of solid electrolyte membranes previously made are laminated and bonded with each other by hot pressing, a method in which an adhesive membrane is used as an adhesive to bond together other solid electrolyte membranes, a method in which a solution formed by using a material of a resin layer is applied onto a substrate, then the solvent is evaporated to form a resin layer formed of the material, and this operation is repeated, a method in which a resin layer formation by vapor deposition or sputtering, etc. is repeatedly conducted on a substrate for a lamination, a method in which many of the resin layers are laminated by a combination of these methods, and a method in which solid electrolyte membranes are laminated, followed by putting a pressure in the direction of the surface to maintain the laminated membrane.

In case that the solid electrolyte membrane and a resin layer as the solid electrolyte membrane contain a hydroxyl group, it is possible to have insolubilization in methanol by generating crosslinking through a heating treatment. It is considered as being preferable. Therefore, it is preferable to conduct the heating treatment.

The thickness of each layer 1, 2, 3, . . . , or X for constructing a proton conducting polymer membrane of the present invention is preferably 10 μm or greater in order to make the handling easy and to prevent damage of the solid electrolyte membrane as the material. In case that proton conductivity of each layer is greater than $10^{-4}$ S/cm, it is preferable to have 200 μm or less in order to transmit protons. In case that proton conductivity is lower than $10^{-4}$ S/cm, it is preferable to have a thickness at which the resistance value of the layer does not exceed 100 Ω·cm². In the case of exceeding the thickness, the transmission of protons of the proton conducting polymer membrane becomes difficult. In other words, the resistance value becomes large, and internal resistance of the polymer electrolyte fuel cell or the direct methanol fuel cell becomes extremely large, thereby lowering the power generation efficiency. As to the unit of conductivity, S refers to Siemens.

On the surfaces of both sides of the proton conducting polymer membrane, it is optional to add metal layers by a method such as vapor deposition or sputtering. When having made a polymer electrolyte fuel cell or a direct methanol fuel cell, in the case of lowering resistance of contact with the catalyst layer, it is possible to sufficiently lower the contact resistance, if the metal layer has a thickness of about 5 nm.

2. Solid Electrolyte Membrane

Next, a solid electrolyte membrane for making a proton conducting polymer membrane of the present invention is explained.

2.1 Solid Electrolyte Membrane Formed by Using a Resin Having a Bis(Perfluoroalkanesulfonyl)Methide Group in the Chemical Structure Since bis(perfluoroalkanesulfonyl)methide group has a bulky $CF_3$ group, it is considered to have a function of preventing aggregation of water in the solid electrolyte membrane. It is presumed that, since water is hardly aggregated, the clusters of water are smaller than those of the electrolyte membrane formed by using a resin having a sulfonic acid group in the chemical structure, thereby preventing the transmission of methanol, which has a high affinity with water. In the solid electrolyte membrane formed by using a resin having a sulfonic acid group in the chemical structure, it is presumed that water adsorbed to the sulfonic acid group in the solid electrolyte membrane aggregates to form relatively large clusters of water so that methanol having a high affinity with water is transmitted with ease.

In the solid electrolyte membrane containing a bis(perfluoroalkanesulfonyl)methide group, it is preferable that the bis(perfluoroalkanesulfonyl)methide group exists as a side chain of the mother polymer as a main chain.

If it can be used as a solid electrolyte membrane, the main chain (mother polymer) having a bis(perfluoroalkanesulfonyl)methide group as a side chain is at least one selected from the group consisting of perfluorocarbon chain, acrylic chain, polyacrylate chain, polymethacrylate polymethylmethacrylate chain, polystyrene chain, polysilicone chain, polyacrylamide chain, polyether ether ketone chain, and polyether chain.

For example, it is possible to cite polystyrene bis(perfluoroalkanesulfonyl)methide as a polystyrene, polyvinyl bis(perfluoroalkanesulfonyl)methide as a polyvinyl, poly-acrylamide-2-methylpropane bis(perfluoroalkanesulfonyl) methide as a polyacrylamide, bis(perfluoroalkanesulfonyl) methidized polyether ether ketone as a polyether ether ketone, bis(perfluoroalkanesulfonyl)methidized polyether as a polyether.

Furthermore, if a membrane-electrode assembly is prepared by using a proton conducting polymer membrane of the present invention which is prepared by using a methacrylic acid series resin having a bis(perfluoroalkanesulfonyl)methide group in the chemical structure as a solid electrolyte and laminating it with a solid electrolyte membrane formed by using a resin having a sulfonic acid group in the chemical structure or which is prepared by using as a solid electrolyte a styrene series resin or a silicone resin having a bis(perfluoroalkanesulfonyl)methide group in the chemical structure that is prepared by adding the bis(perfluoroalkanesulfonyl) methide group to a styrene series resin or a silicone resin and laminating it with a solid electrolyte membrane formed by using a resin having a sulfonic acid group in the chemical structure followed by preparing a polymer electrolyte fuel cell, particularly a direct methanol fuel cell, it results in the obtainment of electromotive force. Therefore, it functions as a polymer electrolyte fuel cell, particularly a direct methanol fuel cell. In the present invention, a methacrylic acid series resin refers to a resin prepared by a homopolymerization of methacrylic acid or a copolymerization with another polymerizable compound. A styrene series resin refers to a resin prepared by a homopolymerization of styrene or a copolymerization with another polymerizable compound. A silicone resin refers to a resin having a main skeleton formed by siloxane bonds.

As specific polymerizable compounds, it is possible to cite at least one polymerizable compound selected from a bis(perfluoroalkanesulfonypmethidized methacrylate, which is a polymerizable compound of acrylic acid having a bis(perfluoroalkanesulfonyl)methide group in the chemical structure, a bis(perfluoroalkanesulfonyl)methidized styrene, which is a polymerizable compound of styrene, or a bis(perfluoroalkanesulfonyl)methidized silicone, which is a polymerizable compound of silicone. It is optional to use a plurality of these.

There is preferably used a solid electrolyte membrane prepared by using a resin prepared by polymerizing a bis(perfluoroalkanesulfonyl)methidized methacrylate as a polymerizable compound, due to its easiness of synthesis. If a methacrylic acid polymerizable compound having a bis(perfluoroalkanesulfonyl)methide group in the chemical structure is selected as a polymerizable compound having a bis(perfluoroalkanesulfonyl)methide group in the chemical structure, which is a raw material of the solid electrolyte membrane, the polymerization becomes easy. Thus, it becomes easy to obtain a resin.

For fuel cells operating at high temperatures, it is possible to use a silanol-containing poly-organic siloxane or the like superior in heat resistance as the solid electrolyte membrane. As a material of a proton conducting polymer membrane of the present invention, it is possible to use a solid electrolyte membrane prepared by using a silicone resin prepared by polymerizing a silicone series polymerizable compound containing a bis(perfluoroalkanesulfonyl)methide group.

2.2 Solid Electrolyte Membrane Prepared by Using a Resin Having a Sulfonyl Acid Group in the Chemical Structure In the present invention, there was obtained a proton conducting polymer membrane that suppressed the transmission of methanol or hydrogen and was satisfactory in adhesion with the electrode in addition to proton conductivity, by using at least one solid electrolyte membrane made of a resin containing at least a bis(perfluoroalkanesulfonyl)methide group as a material of the proton conducting polymer membrane as a laminated membrane and by laminating it with a solid electrolyte membrane made of a resin having a sulfonic acid group in the chemical structure, which obtained an effect of bonding with the electrodes with good adhesion.

In the present invention, it is preferable that the resin having a sulfonic acid group in the chemical structure is at least one selected from the group consisting of polystyrene, polyvinyl, polyacrylamide, polyether ether ketone, and polyether. For example, it is at least one selected from the group consisting of polystyrene sulfonic acid, polyvinyl sulfonic acid, poly-acrylamide-2-methylpropane sulfonic acid, sulfonylated polyether ether ketone, and sulfonylated polyether. Furthermore, in the solid electrolyte membrane prepared by using a resin having a sulfonic acid group in the chemical structure, the resin having the sulfonic acid group in the chemical structure is preferably perfluoro containing no hydrogen atoms in order to prevent tensile strength damage caused by swelling by water, etc.

Due to having a superior ion conductivity and durability, it is preferable to use a solid electrolyte membrane prepared by using a resin having a perfluorocarbonsulfonic acid group in the chemical structure. Specifically, it is possible to cite Nafion (a registered trademark) developed by US Du Pont Co.

Nafion is a resin having a sulfonic acid group in the chemical structure. It is a resin composed of a main chain having a tetrafluoroethylene moiety and a perfluoroalkyl side chain having a sulfonic acid group. In detail, Nafion is a perfluorocarbon material composed of a carbon-fluorine composed, hydrophobic tetrafluoroethylene skeleton and a perfluoroalkyl side chain having a sulfonic acid group. It is a long-chain, non-crosslinked polymer that is a copolymer between tetrafluoroethylene and perfluoro[2-(fluorosulfonylethoxy)propylvinyl ether] and has the following structure. That is, it is a polyvinyl resin prepared by a copolymerization between tetrafluoroethylene and a perfluoroalkylvinyl ether having a sulfonic acid group in the chemical structure.

It is preferable to dispose a chemically stable, perfluorosulfonic acid series resin, for example, layers made of Nafion on the surfaces of both sides of a proton conducting polymer membrane of the present invention, which is directly exposed to an electrode reaction in the polymer electrolyte fuel cell or the direct methanol fuel cell.

2.3 Other Solid Electrolyte Membranes

When adhering a proton conducting polymer membrane of the present invention to the electrode, it is optional to laminate, in addition to the above-mentioned solid electrolyte membrane, a membrane using a resin made of a chain polymer containing a hydroxyl group and having no side chains, for example, polyvinyl alcohol, in order to have adhesiveness and a strong adhesion to the electrode.

3. Membrane-Electrode Assembly, Polymer Electrolyte Fuel Cell, and Direct Methanol Fuel Cell The present invention is a membrane-electrode assembly characterized by being equipped with a pair of electrodes disposed to interpose the above-mentioned proton conducting polymer membrane.

When using a proton conducting polymer membrane of the present invention as a direct methanol fuel cell, for example, a soft resin layer having a sulfonic acid group in the chemical structure is in charge of an adhesion to a methanol oxidation electrode catalyst supported on the fuel electrode or an oxygen reduction electrode catalyst supported on the air electrode and protects a hard resin layer having a bis(perfluoroalkanesulfonyl)methide group in the chemical structure. Therefore, it has become easy to use a solid electrolyte membrane prepared by using a resin having a bis(perfluoroalkanesulfonyl)methide group in the chemical structure.

By using a membrane-electrode assembly of the present invention as a power generation element of a direct methanol fuel cell, the proton conducting polymer membrane has a superior proton conductivity and suppresses the transmission of methanol. Therefore, it becomes possible to achieve an efficient power generation, increase the amount of power generation or downsize the fuel tank due to the increase of methanol concentration, and simplify a power generation control section attached to the membrane-electrode assembly. Thus, it becomes easy to downsize the equipment. Furthermore, in a membrane-electrode assembly of the present invention, the above-mentioned sulfonic acid-containing layer or another soft layer of the proton conducting polymer membrane is in charge of an adhesion to the catalyst supported on the electrode. Therefore, it also becomes possible to use as a layer a solid electrolyte membrane that is hard and low in chemical stability by making a laminated membrane as mentioned above.

In some cases, it is possible to obtain a membrane-electrode assembly having a superior adhesion by only a mechanical pressure bonding even if no heat treatment is conducted. Therefore, it becomes possible to simplify the preparation steps.

Furthermore, in the present invention, it is preferable to dispose layers that are made of a material superior in chemical stability or superior in adhesion, for example, layers made of a perfluorosulfonic acid series resin, such as Nafion, on both surface layers of the proton conducting polymer membrane, which is directly exposed to an electrode reaction in polymer electrolyte fuel cells and direct methanol fuel cells.

When forming a membrane-electrode assembly, it is possible to form a good bonding capable of smoothly moving protons at an interface between the proton conducting polymer membrane and the electrode by forming also on the electrode side a layer made of the same material as that of the proton conducting polymer membrane by a method, such as coating, followed by adhesion or fusion.

4. Separator

Furthermore, a polymer electrolyte fuel cell or a direct methanol fuel cell of the present invention may be equipped with a pair of separators disposed to interpose the membrane-electrode assembly. It may have a structure prepared by laminating a plurality of the membrane-electrode assemblies using a laminated membrane using at least one solid electrolyte membrane having a bis(perfluoroalkanesulfonyl)methide group in the chemical structure.

The separator has functions of forming a passage for supplying methanol, hydrogen or oxygen and electrically connecting adjacent power generation cells or membrane-electrode assemblies. Since the separator is required to have corrosion resistance and electrical conductivity, a carbon series material or a metal series material, such as stainless steel, is mainly used as the material for the separator. The power generation cell refers to a fuel cell power generation unit in which a membrane-electrode assembly is interposed between a pair of separators with gas passages formed therein. It is preferable to dispose a carbon sheet between the separator and the membrane-electrode assembly.

5. Comparison Between a Resin Membrane Having a Bis(Perfluoroalkanesulfonyl)Methide Group in the Chemical Structure and a Resin Prepared by a Copolymerization Between Tetrafluoroethylene and a Perfluoroalkyl Vinyl Ether Having a Sulfonic Acid Group in the Chemical Structure A comparison was made between a resin membrane (mentioned as methide membrane in Table 2) having a bis(perfluoroalkanesulfonyl)methide group in the chemical structure and a Nafion membrane using a resin prepared by a copolymerization between tetrafluoroethylene and a perfluoroalkyl vinyl ether having a sulfonic acid group in the chemical structure. It is summarized in the following table. A superior one was judged as good.

TABLE 1

| | Proton conductivity | Methanol cross leak | Adhesion to electrode | Excellent toughness of membrane | Hardness of membrane |
|---|---|---|---|---|---|
| Methide membrane | Good | Good | — | — | Hard & brittle |
| Nafion membrane | — | — | Good | Good | Soft |

In a membrane-electrode assembly equipped with a proton conducting polymer membrane of a three-layer structure prepared by a lamination by interposing a solid electrolyte membrane formed by using a resin having a bis(perfluoroalkanesulfonyl)methide group in the chemical structure between solid electrolyte membranes (Nafion membranes) formed by using a resin prepared by a copolymerization between tetrafluoroethylene and a perfluoroalkyl vinyl ether having a sulfonic acid group in the chemical structure, and a pair of electrodes disposed to interpose the polymer membrane, an adhesion between the Nafion membrane and the electrode is good, and an adhesion between the Nafion membrane and the methide membrane is good. In this manner, a superior polymer electrolyte fuel cell, particularly a direct methanol fuel cell, was obtained by compensating mutual characteristics.

EXAMPLES

A proton conducting polymer membrane of the present invention is shown by specific examples in the following. The example, however, shows one example of embodiments, such as the production of a proton conducting polymer membrane of the present invention. The proton conducting polymer membrane of the present invention is not limited to the following examples.

In the present examples, a membrane-electrode assembly was prepared by using a proton conducting polymer membrane of the present invention of a three-layer structure prepared by holding both sides of a solid electrolyte membrane using a resin having a bis(perfluoroalkanesulfonyl)methide group, which is satisfactory in blocking methanol, between solid electrolyte membranes using a resin prepared by a copolymerization between tetrafluoroethylene and a perfluoroalkyl vinyl ether having a sulfonic acid group in the chemical structure, which are bonded to the electrodes with a good adhesion. Furthermore, a polymer electrolyte fuel cell using protons as the fuel and a direct methanol fuel cell using methanol as the fuel, which had been prepared by using the same, were confirmed to obtain voltage.

Specifically, a methacrylic acid series resin membrane (Example 1), a styrene series resin membrane (Example 2) or a silicone resin membrane (Example 3), having a bis(perfluoroalkanesulfonyl)methide group in the chemical structure, was prepared, followed by measuring methanol transmission rate. Then, there were prepared proton conducting polymer membranes (Examples 5-1 to 5-2) laminated with other resins.

Then, a membrane-electrode assembly was prepared, followed by measuring the output (electromotive force) as a polymer electrolyte fuel cell or a direct methanol fuel cell (Example 5 and Example 6).

In the following, the explanation is conducted in due order.

Example 1

Synthesis of a Methacrylic Acid Series Resin Having a Bis(Perfluoroalkanesulfonyl)Methide Group in the Chemical Structure At first, a methacrylic acid polymerizable compound containing a bis(perfluoroalkanesulfonyl)methide group was synthesized in order to obtain a methacrylic acid series resin having a bis(perfluoroalkanesulfonyl)methide group in the chemical structure.

<Synthesis of a Methacrylic Acid Polymerizable Compound Containing a Bis(Perfluoroalkanesulfonyl)Methide Group>

Under a nitrogen atmosphere, a 100 ml three-neck flask equipped with a reflux condenser was charged with 10 g (0.030 mol) of 3-hydroxy-1,1-bis(trifluoromethanesulfonyl) butanoic acid (in the following, may be abbreviated as ABMD), 35 g of toluene, (0.003 mol) of methanesulfonic acid, and 0.05 g (0.5 parts by mass relative to ABMD) of 2,2-methylene-bis(4-methyl-6-tert-butylphenol) (made by Seiko Chemical Co., Ltd.; product name: NONFLEX MBP), followed by cooling the three-neck flask at 7° C.

Then, under a nitrogen atmosphere, 4.85 g (0.032 mol) of methacrylic acid anhydride (in the following, may be abbreviated as MAAH) was gradually added dropwise to the three-neck flask little by little by spending 10 minutes. After the termination of this addition, while the three-neck flask was heated and maintained at 70° C., it was continued to stir the contents for 3.5 hours.

Then, the three-neck flask was cooled until room temperature (about 20° C.), followed by adding 30 g of toluene and 35 g of pure water to the contents and conducting a washing operation by stirring two times. After conducting the washing operation, the contents were subjected to an azeotropic distillation with toluene, followed by a dehydration operation, then adding 0.123 g of the above-mentioned NONFLEX MBP and conducting a distillation under reduced pressure under a reduced pressure of 70 Pa in a range of 83° C. to 86° C., thereby distilling out 3-methacryloxy-1,1-bis(trifluoromethanesulfonyl)butanoic acid (in the following, may be abbreviated as MA-ABMD) to obtain 9.29 g thereof. In this manner, methanesulfonic acid and MAAH were reacted with ABMD to obtain MA-ABMD. MA-ABMD is an acrylic acid series polymerizable compound having bis(trifluoromethanesulfonyl)methide group —CH(SO$_2$CF$_3$)$_2$ in the chemical structure.

The reaction formula on that occasion is shown in the following.

(Properties of MA-ABMD)

$^1$H-NMR (solvent: deuterated chloroform); σ=6.13 (s, 1H), 5.66 (s, 1H), 5.58 (m, 1H), 5.22 (dd, 1H), 2.71 (m, 2H), 1.94 (s, 3H), 1.42 (d, 3H)

<Synthesis of a Methacrylic Acid Series Resin Having a Bis(Perfluoroalkanesulfonyl)Methide Group in the Chemical Structure>

Using MA-ABMD, a polymerizable compound containing a bis(perfluoroalkanesulfonyl)methide group, which had been obtained by the above-mentioned synthesis, there was synthesized a resin formed by polymerizing a methacrylic acid series polymerizable compound containing a bis(perfluoroalkanesulfonyl)methide group.

A glass flask was charged with 1.51 g (=0.0037 mol) of the above MA-ABMD, 2.64 g (=0.0088 mol) of polyethylene glycol diacrylate (made by Shin-Nakamura Chemical Co., Ltd.; product name: A-200), and 0.10 g of t-butylperoxy pivalate (made by NOF CORPORATION; product name: perbutyl PV) as a polymerization initiator. With a sufficient stirring, deaeration was conducted, followed by introducing nitrogen gas to prepare a solution.

A spacer having a particle size of 0.06 mm was interposed between a pair of glass plates previously prepared. The above solution was put into the space by utilizing capillarity. Under nitrogen atmosphere, it was maintained for 30 minutes in an oven heated to 80° C. Then, the temperature was increased by 1° C. per minute, followed by maintaining at 120° C. for 60 minutes to cure it. After cooling until room temperature, it was immersed in water, thereby obtaining a membrane made of Resin (2) having a thickness of 0.05 mm and a size of 60 mm×60 mm. In this manner, a methacrylic acid series resin membrane having a bis(perfluoroalkanesulfonyl)methide group in the chemical structure was prepared.

(In the above structural formula, X, Y and Z are positive integers representing the degree of polymerization. * represents a bonding arm.)

Example 2

Synthesis of a Styrene Series Resin Having a Bis(Perfluoroalkanesulfonyl)Methide Group in the Chemical Structure Firstly, there was conducted a synthesis of a perfluoromethidization agent for methidizing a styrene resin, for obtaining a styrene series resin having a bis(perfluoroalkanesulfonyl)methide group in the chemical structure.

<Synthesis of a Perfluoromethidization Agent>

1,1,3,3-tetrakis(perfluoroalkylsulfonyl)propane, a perfluoromethidization agent, can be synthesized by the following publicly-known method (U.S. Pat. No. 4,053,519).

Then, there was synthesized a styrene resin as a precursor when conducting the perfluoromethidization, followed by supporting it on a polytetrafluoroethylene porous membrane.

<Synthesis of a Styrene Resin>

A glass flask was charged with 17.62 g (=0.10 mol) of para-tert-butoxystyrene (made by Wako Pure Chemical Industries, Ltd.), 0.52 g (=0.004 mol) of divinylbenzene (made by US Aldrich Co.), 2.65 g (=0.05 mol) of acrylonitrile (made by Wako Pure Chemical Industries, Ltd.), and 0.10 g of tert-butylperoxy pivalate (made by NOF CORPORATION; product name: perbutyl PV) as a polymerization initiator. With a sufficient stirring, deaeration was conducted, followed by introducing nitrogen gas to prepare a solution. A polytetrafluoroethylene membrane (made by Advantaec Toyo Kaisha, Ltd., product name: H100A) having a porosity of 83% was interposed between a pair of glass plates previously prepared. The above solution was put into the space by utilizing capillarity. Under nitrogen atmosphere, it was maintained for 30 minutes in an oven heated to 80° C. Then, the temperature was increased by 1° C. per minute, followed by maintaining at 120° C. for 60 minutes to cure it. After cooling until room temperature, it was immersed in water, thereby obtaining a membrane (thickness: 0.05 mm; size: 60 mm×60 mm) in which the following styrene series resin (3) has been supported on the polytetrafluoroethylene membrane having a porosity of 83%.

(3)

(In the above structural formula, X, Y and Z are positive integers representing the degree of polymerization. * represents a bonding arm.)

After immersing the obtained membrane in a hydrochloric acid solution having a concentration of 35 mass % for 12 hours, it was taken out, followed by repeating three times a washing operation of immersing it in 1 L ion-exchange water. Then, it was dried in a vacuum drier maintained at 70° C., thereby obtaining a membrane (thickness: 0.05 mm; size: 60 mm×60 mm) in which a polytetrafluoroethylene membrane having a porosity of 83% has been impregnated with the following styrene series resin (4).

(4)

In the above structural formula, X, Y and Z are positive integers representing the degree of polymerization. * represents a bonding arm.

<Synthesis of a Styrene Series Resin Having a Bis(Perfluoroalkanesulfonyl)Methide Group in the Chemical Structure>

A styrene series resin (5) having a bis(perfluoroalkanesulfonyl)methide group in the chemical structure was obtained by methidizing the above styrene resin (4) using the above methidization agent.

The membrane charged with the styrene series resin (4) was immersed for 12 hours in a mixed solution of 5.72 g (=0.01 mol) of 1,1,3,3-tetrakis(perfluoroalkylsulfonyl)propane and 10 ml of acetonitrile. Then, the membrane was taken out, followed by repeating three times a washing operation of immersing in 500 ml of acetonitrile, thereby obtaining a membrane (thickness; 0.05 mm; size: 60 mm×60 mm) in which the polytetrafluoroethylene membrane having a porosity of 83% has been charged with the following styrene series resin (5). In this manner, there was prepared a styrene series resin membrane having bis(trifluoromethanesulfonyl)methide group —CH(SO$_2$CF$_3$)$_2$ as a bis(perfluoroalkanesulfonyl)methide group.

(5)

(In the above structural formula, X1, X2, Y and Z are positive integers representing the degree of polymerization. * represents a bonding arm.

Example 3

Synthesis of a Silicone Resin Having a Bis(Perfluoroalkanesulfonyl)Methide Group in the Chemical Structure)

A silicone resin having a bis(perfluoroalkanesulfonyl)methide group in the chemical structure was synthesized.

Firstly, there was synthesized a perfluoromethidization agent for obtaining a silicone resin having a bis(perfluoroalkanesulfonyl)methide group in the chemical structure.

<Synthesis of a Perfluoromethidization Agent>

1,1-bis(trifluoromethanesulfonyl)-3-butene (in the following, it may be abbreviated as BTSB) as the raw material was synthesized by a publicly-known method (see Journal of Organic Chemistry, Vol. 38. No. 19, 1973, 3358).

Under nitrogen atmosphere, a three-neck flask equipped with a reflux condenser and having a volume of 100 ml was charged with each of 126.7 g (0.393 mol) of 1,1-bis(trifluoromethanesulfonyl)-3-butene, 68.7 g of toluene, 15.2 mg (0.0002 parts by mass relative to BTSB) of dichloro(1,5-cyclooctadiene)platinum(II) (made by Tokyo Chemical Industry Co., Ltd.), and 50.0 g (0.4 parts by mass relative to BTSB) of dichloromethylsilane (made by Tokyo Chemical Industry Co., Ltd.). Continuously, under nitrogen atmosphere, stirring was conducted for three minutes for mixing. After that, while this flask was heated by immersion in an oil bath adjusted to 50° C., an addition reaction was conducted for 30 minutes. After termination of the addition reaction, toluene was distilled out under reduced pressure and recovered. Then, a distillation under reduced pressure was conducted. Under a reduced pressure of 533 Pa (4 mmHg), it was distilled out by heating at 105-115° C., thereby obtaining 163.0 g of 4,4-bis(trifluoromethanesulfonyl)butyldichloromethylsilane (in the following, it may be abbreviated as BTSB-DCMS) as a perfluoromethidization agent.

The reaction formula is as follows.

Properties of BTSB-DCMS $^1$H NMR (solvent: deuterated tetrahydrofuran); σ=5.47 (t, J=5.4 Hz, 1H), 1.77 (dt, J=9.0, 6.3 Hz, 2H), 1.15 (m, 2H), 0.51 (t, J=8.8 Hz, 2H), 0 (s, 3H) ppm

19F NMR (solvent: deuterated tetrahydrofuran); σ=−73.21 ppm

Then, using BTSB-DCMS as a perfluoromethidization agent, a silicone series polymerizable compound having a bis(perfluoroalkanesulfonyl)methide group in the chemical structure was synthesized.

<Synthesis of a Polymerizable Compound Having a Bis(Perfluoroalkanesulfonyl)Methide Group in the Chemical Structure>

Using the obtained BTSB-DCMS (compound 1a), a polysiloxane compound was synthesized.

A glass flask was charged with 28.1 g of BTSB-DCMS and 5.9 g of dimethylvinylchlorosilane, followed by adding 10.8 g of tetrahydrofuran and then cooling by immersing the flask in an iced bath. Then, 5.0 g of ion-exchanged water was gradually added dropwise to the flask by spending 10 minutes. After stirring at room temperature (20° C.) for one hour for mixing, it was diluted with isopropyl ether, followed by washing the organic layer with water three times and distilling the solvent off with an evaporator. The obtained viscous liquid was vacuum dried under heating at 150° C., thereby obtaining 23.3 g of polysiloxane compound (6) (the vinyl group content=1.32 mmol/g=1.32 millimoles/gram) in the form of a pale yellow liquid. In the following, the reaction formula is shown.

<Synthesis of a Silicone Resin Having a Bis(Perfluoroalkanesulfonyl)Methide Group in the Chemical Structure>

Then, a silicone resin having a bis(perfluoroalkanesulfonyl)methide group in the chemical structure was synthesized.

In a glass flask, to 100 parts by mass (the vinyl group content=1.32 mmol/g) of polysiloxane compound (6), that is, dimethylvinylsilyl group-containing bis(trifluoromethanesulfonyl)butyl(methyl)siloxane terminated with dimethylvinylsilane groups at both ends of the molecular chain, 29 parts by mass of 1,3-divinyltetramethyldisiloxane, 57 parts of 1,1,3,3-tetramethylsiloxane, 10 parts by mass of phenylsilane, 32 parts of butylacetate, and 0.1 parts by mass (50 ppm) of dichloro(1,5-cyclooctadiene)platinum(II), followed by mixing. After the mixing, it was put into a thermostat, followed by a stepwise heating at 80° C. for 30 minutes, at 100° C. for 30 minutes, at 120° C. for 30 minutes, and at 150° C. for 30 minutes. Then, it was evenly applied onto a polytetrafluoroethylene plate by a bar coater, followed by a heating at 180° C. for 15 hours, thereby obtaining a cured membrane made of silicone resin (7). In the following, the reaction formula is shown.

In this manner, there was prepared a silicone resin membrane having bis(trifluoromethanesulfonyl)methide group —CH(SO$_2$CF$_3$) as a bis(perfluoroalkanesulfonyl)methide group in the chemical structure.

Example 4

Measurement of Methanol Transmission Rate

Then, solid electrolyte membranes using the resin membranes obtained by Examples 1-3 were prepared, followed by evaluating the methanol transmission rates.

Firstly, solid electrolyte membranes for measuring the methanol transmission rates were prepared.

<Preparation of Solid Electrolyte Membranes>

Three of the methacrylic acid series resin membranes having a bis(perfluoroalkanesulfonyl)methide group in the chemical structure, prepared by Example 1, were laminated together to prepare a laminated membrane having a total thickness of 0.15 mm and a size of 60 mm×60 mm (Example 4-1).

Then, three of the styrene series resin membranes having a bis(perfluoroalkanesulfonyl)methide group in the chemical structure, prepared by Example 2, were laminated together to prepare a laminated membrane having a total thickness of 0.15 mm and a size of 60 mm×60 mm (Example 4-2).

Then, three of the silicone resin membranes having a bis(perfluoroalkanesulfonyl)methide group in the chemical structure, prepared by Example 3, were laminated together to prepare a laminated membrane having a total thickness of 0.15 mm and a size of 60 mm×60 mm (Example 4-3).

Comparative Example 1

As a solid electrolyte membrane made of the above-mentioned perfluorocarbonsulfonic acid series polymer, three of Nafion membrane 112 membranes (in the following, it is referred to as Nafion membrane) (thickness: 0.05 mm, size: 60 mm×60 mm) made by US Aldrich Co. were laminated together.

Comparative Example 2

A Nafion membrane having a thickness of 0.15 mm and a size of 60 mm×60 mm was prepared.

<Measurement of Methanol Transmission Rate>

The membranes obtained by Examples 1 to 3, 4-1, 4-2 and 4-3 and Nafion membranes of Comparative Examples 1 and 2 were subjected to the measurement of the methanol transmission rate.

The methanol transmission rate was measured by the following method. After immersion in ion-exchanged water for one day, the membranes of Examples 1 to 3, 4-1, 4-2 and 4-3 and Nafion membranes of Comparative Examples 1 and 2 were put into a separable-type glass cell used by combining two pairs of glass cells made by Techno-sigma Company. 20 ml of methanol aqueous solution adjusted to 10 mass % was put into one glass cell, and 20 ml of ion-exchange water was put into the other glass cell. At 25° C., under stirring, the methanol concentration of the ion-exchange water was measured by a gas chromatograph (made by Shimadzu Corporation; model number: GC2010).

The methanol transmission rate measurement results of the membranes of Examples 1 to 3, 4-1, 4-2 and 4-3 and Nafion membranes of Comparative Examples 1 and 2 are shown in Table 2.

TABLE 2

| | Membrane type | Membrane Thickness (mm) | Methanol Trans. Rate ($10^{-6}$ mol/ $cm^2 \cdot min$) |
|---|---|---|---|
| Example 1 | Tf group-containing methacrylic acid series resin | 0.05 | 4.3 |
| Example 2 | Tf group-containing styrene series resin | 0.05 | 2.2 |
| Example 3 | Tf group-containing silicone resin | 0.05 | 0.4 |
| Example 4-1 | Lamination of three membranes of Example 1 | 0.15 | 2.2 |
| Example 4-2 | Lamination of three membranes of Example 2 | 0.15 | 1.0 |
| Example 4-3 | Lamination of three membranes of Example 3 | 0.15 | 0.2 |
| Com. Ex. 1 | Nafion membranes | 0.15 | 26.2 |
| Com. Ex. 2 | Nafion membrane | 0.15 | 32.2 |

Tf: bis(perfluoroalkanesulfonyl)methide group

As is clear from Table 2, in comparison between the solid electrolyte membranes obtained by Examples 1 to 3, 4-1, 4-2 and 4-3 and the Nafion membranes of Comparative Examples 1 and 2 containing no bis(perfluoroalkanesulfonyl)methide group, the solid electrolyte membranes of Examples 1 and 2 of the present invention showed smaller methanol transmission rate values by one digit. From this, it was understood that the solid electrolyte membranes of Examples 1 to 3, 4-1, 4-2 and 4-3 made of resins having a bis(perfluoroalkanesulfonyl) methide group in the chemical structure have superior methanol blocking properties than those of Nafion membranes of Comparative Examples 1 and 2.

Example 5

Each resin membrane having a bis(perfluoroalkanesulfonyl)methide group in the chemical structure obtained by Examples 1 to 3 was laminated with perfluorosulfonic acid series resin membranes to prepare a proton conducting polymer membrane (Example 5-1 to Example 5-3) of the present invention. Using that, a membrane-electrode assembly was prepared. When making a polymer electrolyte fuel cell, electromotive force was measured.

<Preparation of Proton Conducting Polymer Membrane>

Each resin membrane (thickness; 0.05 mm; size; 60 mm×60 mm) having a (perfluoroalkanesulfonyl)methide group in the chemical structure was interposed between two Nafion membranes (thickness; 0.05 mm; size; 60 mm×60 mm) as perfluorosulfonic acid series resin membranes to prepare a proton conducting polymer membrane of the present invention.

A proton conducting polymer membrane of Example 5-1 has been formed by sandwiching both sides of a methacrylic acid series resin membrane having a bis(perfluoroalkanesulfonyl)methide group in the chemical structure of Example 1 between two resin membranes having a perfluorosulfonic acid series resin film in the chemical structure. A proton conducting polymer membrane of Example 5-2 has been formed by sandwiching both sides of a styrene series resin membrane having a bis(perfluoroalkanesulfonyl)methide group in the chemical structure of Example 2 between two resin membranes having a perfluorosulfonic acid series resin film in the chemical structure. A proton conducting polymer membrane of Example 5-3 has been formed by sandwiching both sides of a silicone resin membrane having a bis(perfluoroalkanesulfonyl)methide group in the chemical structure of Example 3 between two resin membranes having a perfluorosulfonic acid series resin film in the chemical structure.

<Measurement of Electromotive Force of a Polymer Solid Electrolyte Fuel Cell Using Protons as the Fuel>

Then, using a proton conducting polymer membrane of Examples 5-1 to 5-3, a membrane-electrode assembly was prepared. When making a polymer electrolyte fuel cell, electromotive force was measured.

[Preparation of a Membrane-Electrode Assembly]

In the following, the procedures of preparing a membrane-electrode assembly using a resin membrane having a bis (perfluoroalkanesulfonyl)methide group in the chemical structure and membranes having a perfluorosulfonic acid series resin membrane in the chemical structure and the evaluation results are explained in due order.

<Electrode Preparation>

Then, a catalyst-supported electrode was prepared. FIG. 2 shows a schematic sectional view of the electrode.

Firstly, a carbon sheet 6 (thickness: 0.18 mm; size: 25×25 mm) was immersed in a polytetrafluoroethylene fine particle dispersion, and the carbon sheet 6 taken out was dried by heating at 120° C. for one hour.

Then, an isopropyl alcohol dispersion of a Nafion resin was added to a mixed solvent of water and isopropyl alcohol, followed by adding platinum fine particles-supported carbon particles such that the mass ratio of the Nafion resin to the platinum fine particles became 50:50. The mixed liquid was applied to one surface of the carbon sheet 6 such that the amount of platinum became 1.0 mg/cm², followed by heating at 70° C. in an oven for drying, thereby obtaining a catalyst layer 5. In this manner, an electrode 4 formed of the carbon sheet 6 and the catalyst layer 5 was obtained.

<Preparation of a Membrane-Electrode Assembly>

Figure 3:
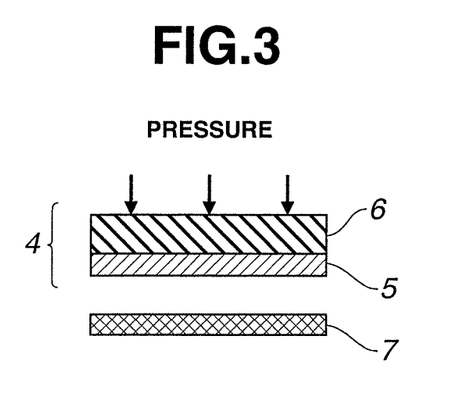
FIG. 3 is an explanatory view of a step of fusing the electrode to a Nafion layer.

FIG. 3 shows an explanatory view of a step of fusing the electrode to a Nafion layer.

As shown in FIG. 3, the electrode 4 was cut to have a size of 1 cm×1 cm (1 cm$^2$), and the electrode 4 with the catalyst layer 5 was disposed to be in contact with the Nafion membrane (thickness: 0.05 mm, size: 60 mm×60 mm). While adding a pressure of 2.0 MPa, it was maintained at 150° C. for 10 minutes, thereby fusing and uniting the Nafion membrane 7 with the electrode 4.

Figure 4:
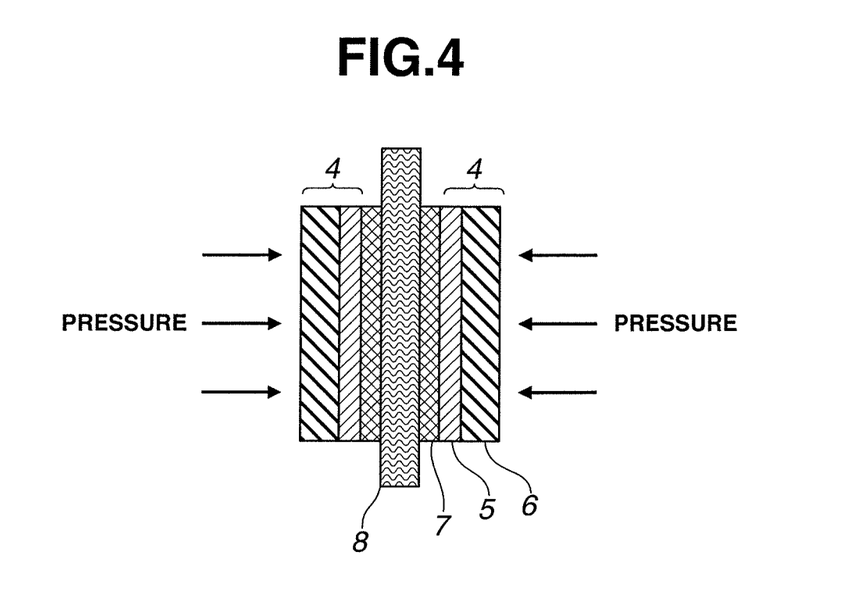
FIG. 4 is a schematic sectional view of a membrane-electrode assembly prepared by the present example.

FIG. 4 shows a schematic sectional view of a membrane-electrode assembly prepared by the present example.

As shown in FIG. 4, in a membrane-electrode assembly using a proton conducting polymer membrane prepared by Example 5-1, adhesion between the Nafion layer 7 and a methacrylic acid series resin membrane 8 containing a bis(perfluoroalkanesulfonyl)methide group is conducted by a pressure generated by a structure installed in a power generation cell. As the power generation environment, under room temperature (25° C.), the power generation was conducted in a manner that hydrogen was used as the fuel, that the hydrogen supply to the fuel electrode (anode) was conducted from a rubber balloon, and that oxygen in the air was used as the oxygen to the oxygen electrode (cathode).

In the membrane-electrode assembly shown in FIG. 4, the resin membrane 8 was replaced with a proton conducting polymer membrane prepared by Example 5-2, then it was built into a power generation cell by the above-mentioned procedure, and then the power generation was conducted.

In the membrane-electrode assembly shown in FIG. 4, the resin membrane 8 was replaced with a proton conducting polymer membrane prepared by Example 5-3, then it was built into a power generation cell by the above-mentioned procedure, and then the power generation was conducted.

Comparative Example 3

In the membrane-electrode assembly shown in FIG. 4, the resin membrane 8 was replaced with a Nafion membrane (thickness: 0.05 mm; size: 60 mm×60 mm), then it was built into a power generation cell similar to Example 5-1, and then the power generation was conducted.

<Measurement of Electromotive Force when Having Made Polymer Electrolyte Fuel Cells>

Figure 5:
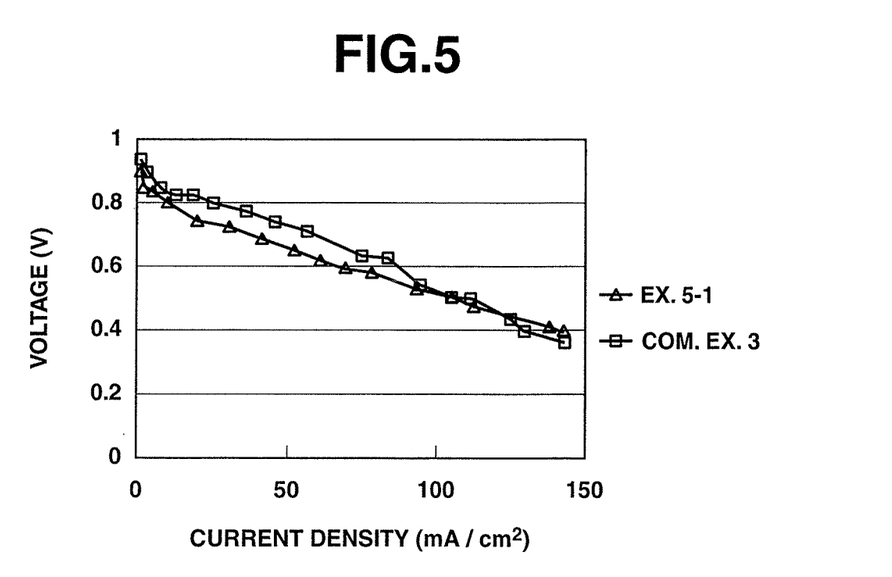
FIG. 5 is a graph resulting from a measurement of current-voltage characteristics of membrane-electrode assemblies prepared by Example 5-1 and Comparative Example 3.

FIG. 5 shows the results of the measurement of output characteristics (current-voltage curve) of the membrane-electrode assembly using the proton conducting polymer membrane prepared by Example 5-1 and the membrane-electrode assembly prepared by Comparative Example 3. It was understood that each one had a sufficient power generation capacity, that the membrane-electrode assembly using the proton conducting polymer membrane prepared by Example 5-1 was 0.95 V in electromotive force, and that it would be useful as a polymer electrolyte fuel cell. Furthermore, in the case of using a membrane-electrode assembly formed by using the proton conducting polymer membrane prepared by Example 5-2, the electromotive force was 0.90 V. In the case of a membrane-electrode assembly formed by using the proton conducting polymer membrane prepared by Example 5-3, an electromotive force of 0.91 V was confirmed. It was understood that they would be useful as polymer electrolyte fuel cells.

Example 6

Measurement of Electromotive Force of Direct Methanol Fuel Cells

The resin membranes made of resins having a bis(perfluoroalkanesulfonyl)methide group in the chemical structure, which have been used in the membrane-electrode assemblies formed by using the proton conducting polymer membranes prepared by Examples 5-1 to 5-3 are superior to the Nafion membranes in blocking methanol. Therefore, it was assumed that the membrane-electrode assemblies formed by using the proton conducting polymer membranes prepared by Examples 5-1 to 5-3 using the resin membranes are more useful as membrane-electrode assemblies for direct methanol fuel cells than the membrane-electrode assembly prepared by Comparative Example 3 using only the Nafion membrane. In order to confirm that it operates as a direct methanol fuel cell, there was prepared a membrane-electrode assembly using a resin membrane having a bis(perfluoroalkanesulfonyl)methide group in the chemical structure, and then there was conducted the measurement of electromotive force when making a direct methanol fuel cell.

In detail, the solid electrolyte membrane having a bis(perfluoroalkanesulfonyl)methide group in the chemical structure obtained by Examples 1 to 3 was interposed between Nafion membranes having a thickness of 0.05 mm and a size of 60 mm×60 mm to prepare an electrode-united laminated membrane, that is, a laminated membrane-electrode assembly. It was confirmed to operate as a direct methanol fuel cell. The explanation is conducted in the order of preparation of electrodes and then preparation of a membrane-electrode assembly.

<Preparation of Electrodes>

1. Preparation of Cathode Electrode

Figure 6:
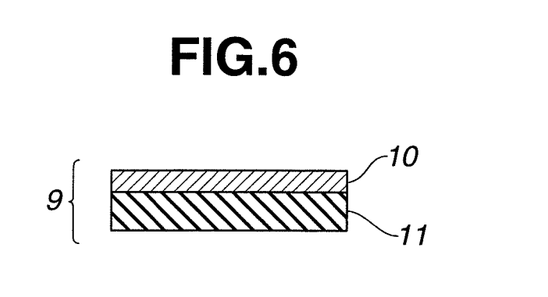
FIG. 6 is a schematic sectional view of an electrode sheet prepared by the present example.

Firstly, there was prepared a catalyst-supported electrode sheet 9 that was a composite sheet of a polytetrafluoroethylene sheet 11 and a cathode catalyst layer 10. FIG. 6 shows a schematic sectional view of the electrode sheet 9.

An isopropyl alcohol dispersion of a Nafion resin was added to a mixed solvent of water and isopropyl alcohol, followed by adding platinum fine particles-supported carbon particles such that the mass ratio of the Nafion resin to the platinum fine particles became 50:50. The liquid was applied to one surface of a polytetrafluoroethylene sheet 11 having a thickness of 0.05 mm and a size of 25 mm×25 mm such that the amount of platinum became 1.0 mg/cm$^2$, followed by heating at 70° C. in an oven for drying, thereby obtaining a cathode catalyst layer 10 to obtain the electrode sheet 9.

2. Preparation of Anode Electrode

Figure 7:
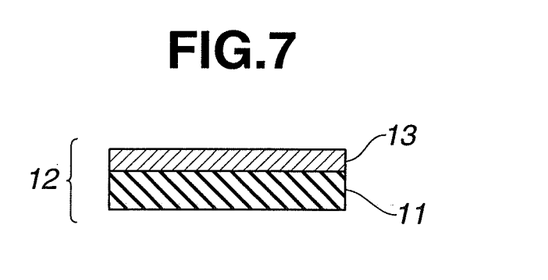
FIG. 7 is a schematic sectional view of an electrode sheet prepared by the present example.

Then, there was prepared an electrode sheet 12 that was a composite sheet of a polytetrafluoroethylene sheet 11 and an anode catalyst layer 13. FIG. 7 shows a schematic sectional view of the electrode sheet 12.

An isopropyl alcohol dispersion of a Nafion resin was added to a mixed solvent of water and isopropyl alcohol, followed by adding platinum-ruthenium alloy fine particles-supported carbon particles such that the mass ratio of the Nafion resin to the platinum-ruthenium fine particles became 50:50. The liquid was applied to one surface of a polytetrafluoroethylene sheet 11 having a thickness of 0.05 mm and a size of 25 mm×25 mm such that the amount of platinum became 1.0 mg/cm$^2$, followed by heating at 70° C. in an oven for drying, thereby obtaining an anode catalyst layer 13 to obtain the electrode sheet 12.

<Preparation of Membrane-Electrode Assembly>

Figure 8:
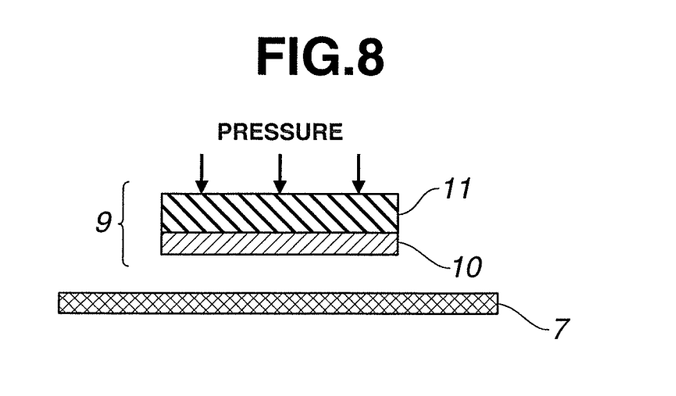
FIG. 8 is an explanatory view of a step of fusing a cathode catalyst layer to the Nafion membrane.
Figure 9:
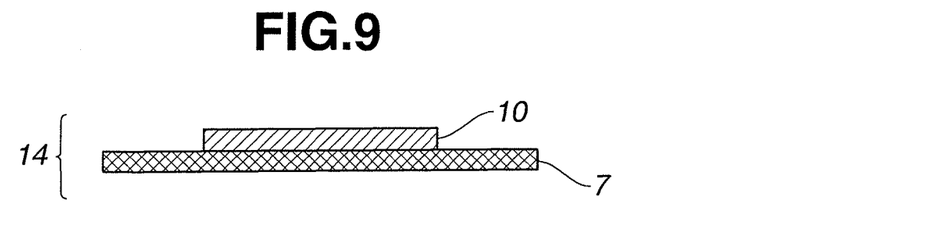
FIG. 9 is a schematic sectional view of a membrane prepared by the present example.
Figure 10:
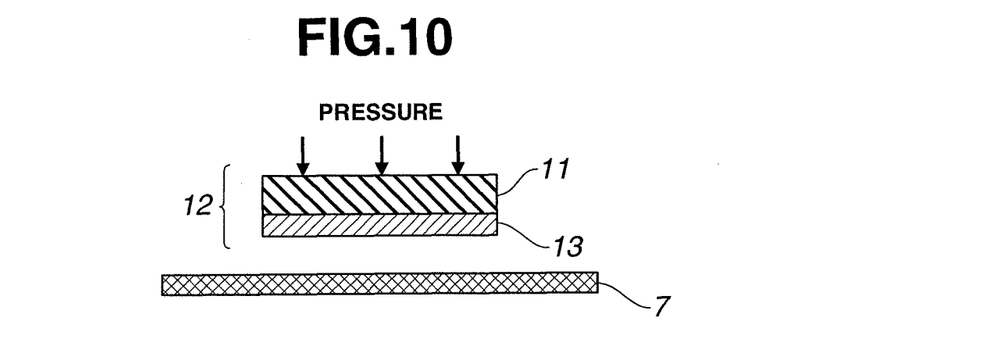
FIG. 10 is an explanatory view of a step of fusing an anode catalyst layer to the Nafion membrane.
Figure 11:
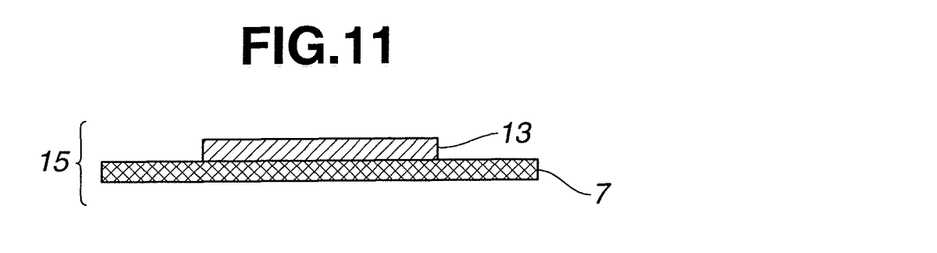
FIG. 11 is a schematic sectional view of a membrane prepared by the present example.
Figure 12:
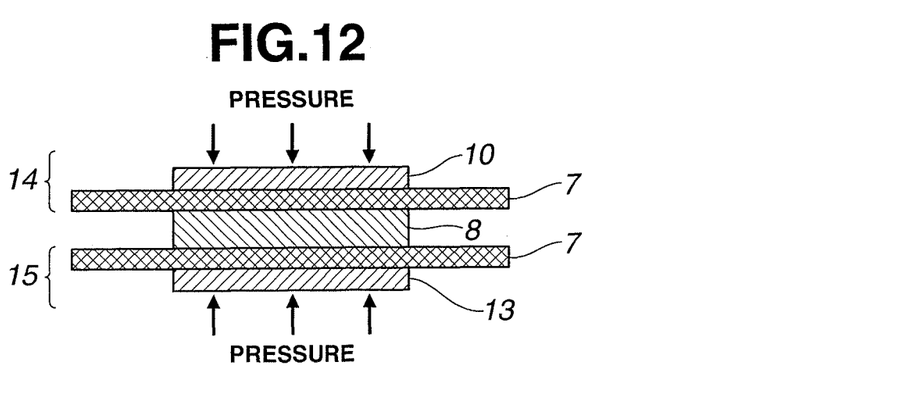
FIG. 12 is a schematic sectional view of a membrane-electrode assembly prepared by the present example.

Using FIGS. 8-12, the steps for preparing a membrane-electrode assembly are explained. FIG. 8 is an explanatory view of a step of fusing a cathode catalyst layer to the Nafion membrane. FIG. 9 is a schematic sectional view of a membrane prepared by the present example. FIG. 10 is an explanatory view of a step of fusing an anode catalyst layer to the Nafion membrane. FIG. 11 is a schematic sectional view of a membrane prepared by the present example. FIG. 12 is a schematic sectional view of a membrane-electrode assembly prepared by the present example.

As shown in FIG. 8, the electrode sheet 9 was disposed to be in contact with the Nafion membrane 7 (thickness: 0.05 mm, size: 60 mm×60 mm). While adding a pressure of 2.0 MPa from both sides, it was maintained at 150° C. for 10 minutes, thereby fusing and uniting the Nafion membrane 7 with the cathode catalyst layer 10. Then, the polytetrafluoroethylene sheet 11 was removed from the cathode catalyst layer 10, thereby preparing a membrane 14, in which the Nafion membrane 7 and the cathode catalyst layer 10 have been united, as shown in FIG. 9.

Then, as shown in FIG. 10, the electrode sheet 12 was disposed to be in contact with the Nafion membrane 7 (thickness: 0.05 mm, size: 60 mm×60 mm). While adding a pressure of 2.0 MPa from both sides, it was maintained at 150° C. for 10 minutes, thereby fusing and uniting the Nafion membrane 7 with the anode catalyst layer 13. Then, the polytetrafluoroethylene sheet 11 was removed from the anode catalyst layer 13, thereby preparing a membrane 15, in which the Nafion membrane 7 and the anode catalyst layer 13 have been united, as shown in FIG. 11.

Example 6-1

Preparation of a Membrane-Electrode Assembly Using a Methacrylic Acid Series Resin Membrane The methacrylic acid series resin membrane 8 (thickness: 0.05 mm, size: 25 mm×25 mm) having a bis(perfluoroalkanesulfonyl)methide group in the chemical structure prepared by Example 1 was interposed between the membrane 14 (in which the Nafion membrane 7 and the cathode catalyst layer 10 have been united) and the membrane 15 (in which the Nafion membrane 7 and the anode catalyst layer 13 have been united). While adding a pressure of 1.0 MPa from both sides under a heating at 120° C., it was maintained for 10 minutes, thereby preparing a laminated membrane-electrode assembly of the present invention shown in FIG. 12, in which the membrane 14, the membrane 15, and the methacrylic acid series resin membrane 8 having a bis(perfluoroalkanesulfonyl)methide group in the chemical structure have been united.

Example 6-2

Preparation of a Membrane-Electrode Assembly Using a Styrene Series Resin Membrane The styrene series resin membrane 8 (thickness: 0.05 mm, size: 25 mm×25 mm) having a bis(perfluoroalkanesulfonyl)methide group in the chemical structure prepared by Example 2 was interposed between the membrane 14 (in which the Nafion membrane 7 and the cathode catalyst layer 10 have been united) and the membrane 15 (in which the Nafion membrane 7 and the anode catalyst layer 13 have been united). While adding a pressure of 1.0 MPa from both sides under a heating at 120° C., it was maintained for 10 minutes, thereby preparing a laminated membrane-electrode assembly of the present invention shown in FIG. 12, in which the membrane 14, the membrane 15, and the styrene series resin membrane 8 having a bis(perfluoroalkanesulfonyl)methide group in the chemical structure have been united.

Example 6-3

Preparation of a Membrane-Electrode Assembly Using a Silicone Resin Membrane

The silicone resin membrane 8 (thickness: 0.05 mm, size: 25 mm×25 mm) having a bis(perfluoroalkanesulfonyl)me-
thide group in the chemical structure prepared by Example 3 was interposed between the membrane 14 (in which the Nafion membrane 7 and the cathode catalyst layer 10 have been united) and the membrane 15 (in which the Nafion membrane 7 and the anode catalyst layer 13 have been united). While adding a pressure of 1.0 MPa from both sides under a heating at 120° C., it was maintained for 10 minutes, thereby preparing a laminated membrane-electrode assembly of the present invention shown in FIG. 12, in which the membrane 14, the membrane 15, and the resin membrane 8 having a bis(perfluoroalkanesulfonyl)methide group in the chemical structure have been united.

<Measurement of Electromotive Force when Having Used as a Direct Methanol Fuel Cell>

A membrane-electrode assembly prepared by Examples 6-1 to 6-3 was built in a power generation cell, then there was conducted a power generation experiment as a direct methanol fuel cell, and the electromotive force was measured.

The electromotive force was measured by allowing a methanol aqueous solution having a concentration of 3 mass % or 30 mass % to flow to the anode side membrane 15 under a condition of 2.0 ml/min and allowing the air humidified to a relative humidity of 100% to flow to the cathode side membrane 14.

The electromotive forces were 0.50 V at a methanol concentration of 3 mass % and 0.43 V at 30 mass %, when a membrane-electrode assembly prepared by Example 6-1 using a laminated membrane containing a methacrylic acid series resin membrane having a bis(perfluoroalkanesulfonyl)methide group in the chemical structure as a proton conducting polymer membrane had been used for a direct methanol fuel cell.

The electromotive forces were 0.52 V at a methanol concentration of 3 mass % and 0.50 V at 30 mass %, when a membrane-electrode assembly prepared by Example 6-2 using a laminated membrane containing a styrene series, methacrylic acid series resin membrane having a bis(perfluoroalkanesulfonyl)methide group in the chemical structure as a proton conducting polymer membrane had been used for a direct methanol fuel cell.

The electromotive forces were 0.57 V at a methanol concentration of 3 mass % and 0.55 V at 30 mass %, when a membrane-electrode assembly prepared by Example 6-3 using a laminated membrane containing a silicone resin membrane having a bis(perfluoroalkanesulfonyl)methide group in the chemical structure as a proton conducting polymer membrane had been used for a direct methanol fuel cell. In this manner, we have confirmed that membrane-electrode assemblies prepared by Examples 6-1 to 6-3 operate as direct methanol fuel cells and obtain electromotive forces.

EXPLANATION OF SIGNS 1 to 3, X layers: (laminated solid electrolyte membranes)
4: an electrode
5: a catalyst layer
6: a carbon sheet
7: a Nafion membrane
8: a resin membrane containing a bis(perfluoroalkanesulfonyl)methide group
9: an electrode sheet
10: a cathode catalyst layer
11: a polytetrafluoroethylene sheet
12: an electrode sheet
13: an anode catalyst layer
14: a membrane in which the Nafion membrane 7 and the cathode catalyst layer 10 have been united 15: a membrane in which the Nafion membrane 7 and the anode catalyst layer 13 have been united

The invention claimed is:

1. A proton conducting polymer membrane comprising:
    a first solid electrolyte membrane containing a resin having a bis(perfluoroalkanesulfonyl)methide group in the chemical structure, and including a first and second surface, and
    a second solid electrolyte membrane containing a resin having a sulfonic acid group in the chemical structure, wherein the second solid electrolyte membrane is disposed on the first surface of the first solid electrolyte member.

2. The proton conducting polymer membrane according to claim 1, wherein the resin having the bis(perfluoroalkanesulfonyl)methide group in the chemical structure is acrylic resin, methacrylic resin, styrene resin, or silicone resin.

3. The proton conducting polymer membrane according to claim 1, wherein the resin having the sulfonic acid group in the chemical structure is at least one selected from the group consisting of polystyrene, polyvinyl, polyacrylamide, polyether ether ketone, and polyether.

4. The proton conducting polymer membrane according to claim 3, wherein the polyvinyl is a resin prepared by a copolymerization between tetrafluoroethylene and a perfluoroalkyl vinyl ether containing the sulfonic acid group in the chemical structure.

5. The proton conducting polymer membrane according to claim 1, further comprising a third solid electrolyte membrane containing a resin having a sulfonic acid group in the chemical structure, wherein the third solid electrolyte membrane is disposed on the second surface of the first solid electrolyte membrane.

6. The proton conducting polymer membrane according to claim 5, consisting of the first, second and third solid electrolyte membranes.

7. A membrane-electrode assembly, comprising the proton conducting polymer membrane according to claim 1, and a pair of electrodes disposed to interpose the proton conducting polymer membrane therebetween.

8. A polymer electrolyte fuel cell, comprising the membrane-electrode assembly of claim 7 and a pair of separators disposed to interpose the membrane-electrode assembly therebetween.

9. A direct methanol fuel cell, comprising the proton conducting polymer membrane according to claim 1.

10. The proton conducting polymer membrane according to claim 1, wherein each of the first and second solid electrolyte membranes has a thickness of 10 μm or greater.

11. A method for producing the proton conducting polymer membrane according to claim 1, comprising the steps of:
    forming the first solid electrolyte membrane;
    forming the second solid electrolyte membrane; and
    disposing the second solid electrolyte membrane on the first surface of the first solid electrolyte membrane.

* * * * *